(12) United States Patent
Lutz et al.

(10) Patent No.: US 10,155,891 B2
(45) Date of Patent: Dec. 18, 2018

(54) ONE-COMPONENT STRUCTURAL ADHESIVE CONTAINING ISOCYANATE-TERMINATED PREPOLYMER

(71) Applicant: Dow Global Technologies LLC, Midland, MI (US)

(72) Inventors: Andreas Lutz, Galgenen (CH); Daniel Schneider, Waedenswil (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/314,148

(22) PCT Filed: Jul. 14, 2015

(86) PCT No.: PCT/US2015/040361
§ 371 (c)(1),
(2) Date: Nov. 28, 2016

(87) PCT Pub. No.: WO2016/014290
PCT Pub. Date: Jan. 28, 2016

(65) Prior Publication Data
US 2017/0130107 A1    May 11, 2017

Related U.S. Application Data

(60) Provisional application No. 62/028,825, filed on Jul. 25, 2014.

(51) Int. Cl.
| | | |
|---|---|---|
| *B29C 65/48* | (2006.01) | |
| *B29C 65/54* | (2006.01) | |
| *C08G 18/10* | (2006.01) | |
| *C08G 18/12* | (2006.01) | |
| *C08G 18/30* | (2006.01) | |
| *C08G 18/48* | (2006.01) | |
| *C08G 18/66* | (2006.01) | |
| *C08G 18/73* | (2006.01) | |
| *C09J 11/04* | (2006.01) | |
| *C09J 175/04* | (2006.01) | |
| *C09J 175/08* | (2006.01) | |

(52) U.S. Cl.
CPC .......... *C09J 175/08* (2013.01); *B29C 65/483* (2013.01); *B29C 65/4865* (2013.01); *B29C 65/54* (2013.01); *C08G 18/10* (2013.01); *C08G 18/12* (2013.01); *C08G 18/307* (2013.01); *C08G 18/4825* (2013.01); *C08G 18/4854* (2013.01); *C08G 18/6677* (2013.01); *C08G 18/73* (2013.01); *C09J 11/04* (2013.01); *C09J 175/04* (2013.01); *C08G 2170/40* (2013.01)

(58) Field of Classification Search
CPC ........ C09J 175/08; C09J 11/04; C09J 175/04; C08G 18/10; C08G 18/4825; C08G 18/73; C08G 2170/40; C08G 18/6677; C08G 18/4854; C08G 18/307; C08G 18/12; B29C 65/54; B29C 65/4865; B29C 65/483
See application file for complete search history.

(56) References Cited

U.S. PATENT DOCUMENTS

| | | | |
|---|---|---|---|
| 3,759,778 A * | 9/1973 | McClung et al. | C08G 18/10 156/331.4 |
| 5,288,797 A | 2/1994 | Khalil et al. | |
| 5,698,656 A | 12/1997 | Ohashi et al. | |
| 6,353,057 B1 * | 3/2002 | He | C08G 18/227 523/415 |
| 6,906,148 B2 | 6/2005 | Krebs et al. | |
| 2003/0045636 A1 | 3/2003 | Krebs et al. | |
| 2013/0101744 A1 * | 4/2013 | Yano | C04B 41/009 427/407.2 |

FOREIGN PATENT DOCUMENTS

| | | |
|---|---|---|
| EP | 573206 A1 | 12/1993 |
| EP | 511586 B1 | 1/1996 |
| EP | 716108 B1 | 5/2001 |
| WO | 2011095469 A2 | 8/2011 |
| WO | 2012091842 A2 | 7/2012 |

\* cited by examiner

Primary Examiner — Rabon A Sergent

(57) ABSTRACT

A one-component structural adhesive comprising an isocyanate-terminated prepolymer having polymerized residues of: (a) 40 to 95 wt % of a polytetramethylene ether glycol; and (b) 5 to 60 wt % of an aliphatic diisocyanate.

10 Claims, No Drawings

ONE-COMPONENT STRUCTURAL ADHESIVE CONTAINING ISOCYANATE-TERMINATED PREPOLYMER

BACKGROUND

This invention relates generally to a one-component high modulus structural adhesive comprising an isocyanate-terminated prepolymer.

One-component urethane adhesives based on prepolymers of polytetramethylene ether glycol (PTMEG) are known. For example, U.S. Pat. No. 5,288,797 discloses a one-component urethane system comprising a prepolymer based on PTMEG in which the isocyanate component is an aromatic isocyanate. However, this reference does not disclose the adhesive described in the current invention.

STATEMENT OF INVENTION

The present invention is directed to a one-component structural adhesive comprising an isocyanate-terminated prepolymer comprising polymerized residues of: (a) 40 to 95 wt % of a polytetramethylene ether glycol; and (b) 5 to 60 wt % of an aliphatic diisocyanate.

The present invention is further directed to a method for bonding coated or painted parts made of fiber-reinforced plastics by applying a one-component structural adhesive comprising an isocyanate-terminated prepolymer comprising polymerized residues of: (a) 40 to 95 wt % of a polytetramethylene ether glycol; and (b) 5 to 60 wt % of an aliphatic diisocyanate to said parts.

DETAILED DESCRIPTION

All percentages are weight percentages, and all temperatures are in ° C., unless otherwise indicated. Percentages of monomer units (e.g., isocyanates and polyols) are on a solids basis, i.e., on the weight of the polymer excluding solvents and other additives.

Aliphatic diisocyanates useful in this invention include, e.g., hexamethylene diisocyanate ("HDI"), methylene dicyclohexyl diisocyanate or (hydrogenated MDI, "HMDI") and isophorone diisocyanate ("IPDI"). HDI is especially preferred.

Polytetramethylene ether glycol (PTMEG, also known as PTHF) is commonly prepared from polymerization of tetrahydrofuran and has the structure $HO\{(CH_2)_4O\}_nH$, where n can vary from about 3 to about 45, corresponding to number-average molecular weights (Mn) from about 250 to about 3000. Preferably, Mn for the PTMEG is from 500 to 3000, preferably from 800 to 2600, preferably from 1100 to 2500, preferably from 1500 to 2200.

Preferably, the isocyanate-terminated prepolymer comprises polymerized residues of: at least 50 wt % PTMEG, preferably at least 55 wt %, preferably at least 60 wt %, preferably at least 70 wt %, preferably at least 75 wt %, preferably at least 80 wt %; preferably no more than 90 wt %, preferably no more than 86 wt %, preferably no more than 82 wt %, preferably no more than 78 wt %. The prepolymer may also contain small amounts of polyols having from three to six hydroxyl groups, preferably $C_3$-$C_{10}$ triols (preferably $C_3$-$C_8$ triols) or tetra-ols, e.g., trimethylolpropane, pentaerythritol. Preferably, polymerized units of polyols having from three to six hydroxy groups are present in an amount from 0 to 5 wt %, preferably from 0.1 to 3 wt %, preferably from 0.2 to 1.5 wt %. In a preferred embodiment of the invention, the prepolymer contains polymerized units of one or more additional polyols, preferably polycaprolactone polyols, preferably in a total amount from 0 to 40 wt %, preferably at least 5 wt %, preferably at least 8 wt %, preferably at least 11 wt %; preferably no more than 35 wt %, preferably no more than 30 wt %, preferably no more than 25 wt %, preferably no more than 22 wt %, preferably no more than 19 wt %. Preferably, the weight of isocyanate groups in the isocyanate-terminated prepolymer is from 1 to 6 wt %, preferably from 1.5 to 5 wt %, preferably from 2 to 4 wt %. Preferably, Mn for the polycaprolactones is from 400 to 3000, preferably from 500 to 2000, preferably from 600 to 1500, preferably from 600 to 1000. Preferably, the isocyanate-terminated prepolymer comprises polymerized residues of: at least 8 wt % aliphatic diisocyanate, preferably at least 10 wt %, preferably at least 12 wt %, preferably at least 14 wt %, preferably at least 18 wt %; preferably no more than 40 wt %, preferably no more than 50 wt %, preferably no more than 45 wt %, preferably no more than 30 wt %, preferably no more than 25 wt %.

The isocyanate-terminated prepolymer may be prepared using a mole ratio of isocyanate groups to hydroxyl groups which may vary as desired, preferably within a molar ratio of NCO/OH groups of 2.5:1 to 1.2:1, preferably from 2.4:1 to 1.3:1, preferably from 2.3:1 to 1.4:1, preferably from 2.3:1 to 1.5:1. Preferably, suitable catalysts are used to aid in formation of the prepolymer, preferably tin or zirconium catalysts, preferably Zr(IV) catalysts, e.g., zirconium acetylacetonate. Preferably, the amount of catalyst in the prepolymer is from 0.005 to 0.15 wt %, preferably 0.01 to 0.1 wt %, preferably 0.02 to 0.08 wt %.

The one-component structural adhesive comprises the isocyanate-terminated prepolymer along with other typical adhesive ingredients, e.g., fillers (e.g., carbon black, kaolin, fumed silica) and catalysts (e.g., bismuth, tin or amine catalysts). Bismuth catalysts are especially preferred, preferably Bi(III) salts, preferably carboxylate salts. The total amount of catalyst(s) preferably is from 0.01 to 4 wt %, preferably from 0.02 to 3 wt %, preferably from 0.05 to 1 wt %; weights based on total weight of the adhesive. Preferably, the urea and urethane content of the adhesive is from 3 to 40 wt %; preferably at least 3.2 wt %, preferably at least 3.4 wt %, preferably at least 3.6 wt %, preferably at least 3.8 wt %; preferably no more than 30 wt %, preferably no more than 20 wt %, preferably no more than 10 wt %, preferably no more than 6 wt %. Preferably, carbon black is present in an amount from 5 to 60 wt %, preferably at least 7 wt %, preferably at least 9 wt %; preferably no more than 50 wt %, preferably no more than 40 wt %, preferably no more than 30 wt %. Preferably, kaolin is present in an amount from 5 to 60 wt %, preferably at least 7 wt %, preferably at least 9 wt %; preferably no more than 50 wt %, preferably no more than 40 wt %. Preferably, the isocyanate-terminated prepolymer is present in the adhesive in an amount from 20 to 100 wt %; preferably at least 30 wt %, preferably at least 35 wt %, preferably at least 40 wt %; preferably at least 45 wt %; preferably no more than 90 wt %, preferably no more than 85 wt %, preferably no more than 82 wt %.

The present invention is directed to a method for bonding coated or painted parts made of fiber-reinforced plastics. These parts bonded to each other or to a dissimilar material, e.g., e-coated steel frames or e-coated metal roofs. Preferred fiber-reinforced plastics are epoxy composite materials or thermoplastics, e.g., SMC. The substrates may be similar material or dissimilar material. The preferred thickness of the adhesive layer is from 1 to 5 mm, preferably from 2 to 4 mm. The compositions of the present invention can be applied to desired substrates using conventional application techniques such as application from automated dispensing equipment and drum pumps.

Examples

TABLE 1

| RAW MATERIAL LIST | | |
|---|---|---|
| Polyols | Supplier | Chemistry |
| Prepolymers | | |
| ACCLAIM 6300 | Bayer | 6300 PPO Triol (Low Mono-ol) |
| VORANOL 4000LM | DOW | 4000 PPO Diol (Low Mono-ol) |
| VORANOL 3322 | DOW | 3500 PPO Triol |
| VORANOL 2000L | DOW | 2000 PPO Diol |
| PolyTHF 2000 | BASF | 2000 PTHF Diol |
| Trimethylolpropane | Perstorp | Short chain triol |
| CAPA 2077A | Perstorp | 750 PCL Diol |
| Isocyanates | | |
| ISONATE M125 | DOW | MDI |
| DESMODURE H | Bayer | HDI |
| ISONATE M 143 | DOW | Liquefied MDI |
| Plasticizer | | |
| VESTINOL 9 | Evonik | Diisononylphthalate |
| Catalysts | | |
| METATIN S-26 | DOW | Tin-(II) octoate |
| Zr(IV)AcAc 40% in benzyl alcohol | Sigma Aldrich/ DOW Adhesives | Zr (IV) Acetylacetonate |
| Plasticizer | | |
| VESTINOL 9 | Evonik | Diisononylphthalate |
| Fumed Silica | | |
| HDK 20 | Wacker Chemie | Pyrogenic silica |

TABLE 1-continued

| RAW MATERIAL LIST | | |
|---|---|---|
| Polyols | Supplier | Chemistry |
| Carbon Black: | | |
| PRINTEX 30 | Evonik | Carbon black |
| Calcinated Kaolin: | | |
| POLESTAR 200R | Imerys | Calcinated Kaoline |
| Uncoated Kaoline | | |
| CARBITAL 140 | Imerys | Uncoated Kaoline |
| Isocyanates | | |
| DESMODURE N3300 | Bayer | Trimerized HDI |
| Catalysts: | | |
| Cat2010 | DOW | Dimethyl-tin-dilaurate/ NMP/Vestinol |
| BiCat 8108M | Shepherd | Bi-(III)-Neodeacanoate |
| DMDEE | BASF | 2,2'-Dimorpholinodiethylether |

Inventive and Comparative Formulations

Seven prepolymers have been synthesized and evaluated in a typical one part PU adhesive formulation.

Comparative formulations A, B and C are using aromatic MDI as diisocyanate compound. All of them are using a PPO polyether-polyol. Formulation A is using a PPO triol, B and C PPO diols with different molecular weights and C additionally A PPO triol.

Formulation D is similar to A but uses an aliphatic diisocyanate, HDI, instead of an aromatic (MDI)

Formulation E uses a PPO polyether-polyol together with a crystalline polyester and an aliphatic diisocyanate (HDI)

Inventive formulation F is similar to E but uses a PTHF (PTMEG) polyether-diol instead of PPO and no polyester Inventive formulation G uses PTHF, polyester and aromatic diisocyanate instead of aliphatic

TABLE 2

| Prepolymer formulation | | | | | | | |
|---|---|---|---|---|---|---|---|
| Prepolymer | A Comp. | B Comp. | C Comp. | D Comp. | E Comp. | F Inv. | G Comp. |
| Polyols | | | | | | | |
| ACCLAIM 6300 | 74.69 | — | — | 91.52 | 61.04 | — | — |
| VORANOL 4000LM | — | 79.44 | — | — | — | — | — |
| VORANOL 3322 | — | — | 42.40 | — | — | — | — |
| VORANOL 2000L | — | — | 42.22 | — | — | — | — |
| PolyTHF 2000 | — | — | — | — | — | 85.10 | 65.34 |
| Trimethylolpropane | — | — | — | — | — | 0.58 | 0.37 |
| CAPA 2077A | — | — | — | — | 22.79 | — | 9.76 |
| Plasticizer | | | | | | | |
| VESTINOL 9 | 15.04 | 10.00 | — | — | — | — | — |
| Isocyanates | | | | | | | |
| HDI | — | — | — | 8.45 | 16.15 | 14.26 | — |
| ISONATE M125 | 10.26 | 10.55 | 15.37 | — | — | — | — |
| ISONATE M143 | — | — | — | — | — | — | 24.47 |
| Catalysts | | | | | | | |
| METATIN S-26 | 0.01 | 0.01 | 0.01 | 0.03 | — | — | — |
| Zr-(IV)-AcAc 40 wt % in BzOH (*) | — | — | — | — | 0.02 | 0.06 | 0.06 |
| Total: | 100.00 | 100.00 | 100.00 | 100.00 | 100.00 | 100.00 | 100.00 |

TABLE 2-continued

| | Prepolymer formulation | | | | | | |
|---|---|---|---|---|---|---|---|
| Prepolymer | A Comp. | B Comp. | C Comp. | D Comp. | E Comp. | F Inv. | G Comp. |
| Calc. NCO [%] | 1.882 | 1.880 | 1.885 | 2.304 | 4.227 | 3.000 | 3.000 |
| NCO/OH | 2.20:1 | 2.13:1 | 1.57:1 | 2.22:1 | 2.10:1 | 1.723:1 | 1.716 |

(*) Zr-(IV)-AcAc 40% in BzOH: 40% Zirconium-(IV)-acetylacetonate dissolved in benzyl alcohol.

General Prepolymer Preparation:

Combine Polyol (1), Polyol (2) and plasticizer in a lab reactor. Stir the mixture under vacuum and heat it up to 120° C. When the material temperature has reached 120° C., cool it down to 50° C. under vacuum. Then add the isocyanate and stir the mixture for 5 min under nitrogen. Add the catalyst and let the mixture react for 30 min. and then determine the isocyanate content. If the isocyanate content is from 0.25% below to 0.1% above the calculated value (by addition of excess dibutylamine and back titration with 1N HCl), set vacuum and let the mixture mix for additional 20 min. Table 3 presents the content of urethane and urea units (hard segments) in the prepolymers. Columns H and L demonstrate that the difference between referenced and inventive prepolymer formulations is mainly in the amount of the total UREA & URETHANE hard segments

TABLE 3 urethane & urea contents in the comparative and inventive prepolymers

| | PREPOLYMER | | | ADHESIVE | | | |
|---|---|---|---|---|---|---|---|
| Prepoly. | (F) total urethane in the prepoly., wt % | (G) total urea after prepoly. curing, wt % | (H) total urethane & urea after curing, wt % | (I) total prepoly. in the adhesive | (J) total urethane after adhesive curing | (K) urea in the adhesive after curing | (L) total urethane & urea in the adhesive after curing |
| A | 2.22 | 1.30 | 3.52 | (1) 51.4 | 1.14 | 0.67 | 1.81 |
| B | 2.36 | 1.30 | 3.66 | (2) 51.4 | 1.21 | 0.67 | 1.88 |
| C | 4.52 | 1.30 | 5.83 | (3) 51.4 | 2.33 | 0.67 | 2.99 |
| D | 2.73 | 1.59 | 4.32 | (4) 62.4 | 1.70 | 0.99 | 2.70 |
| E | 5.43 | 2.92 | 8.35 | (5) 57.4 | 3.12 | 1.68 | 4.79 |
| E | 5.43 | 2.92 | 8.35 | (6) 56.4 | 3.06 | 1.65 | 4.71 |
| F | 5.82 | 2.07 | 7.90 | (7) 53.8 | 3.13 | 1.11 | 4.25 |
| G | 7.35 | 2.07 | 9.42 | (8) 52.4 | 3.85 | 1.09 | 4.93 |
| F | 5.82 | 2.07 | 7.90 | (9) 51.5 | 3.00 | 1.09 | 4.09 |

Adhesive Formulation

Table 4 shows the formulation details of the formulated adhesives. Because of the low basic viscosity of the prepolymer, the adhesive formulations which use the prepolymers D, E and F need no plasticizer.

TABLE 4

Adhesive formulation details

| | | Comp. 1 | Comp. 2 | Comp. 3 | Comp. 4 | Comp. 5 | Comp. 6 | Inv. 7 | Comp. 8 | Inv. 9 |
|---|---|---|---|---|---|---|---|---|---|---|
| | | | | | | polyol | | | | |
| | | PPO | PPO | PPO | PPO | PPO/PCL | PPO/PCL | PTHF | PTHF/PLC | PTHF |
| | | | | | | NCO Type | | | | |
| | | MDI | MDI | MDI | HDI | HDI | HDI | HDI | MDI | HDI |
| | | | | | | P1, wt % | | | | |
| | | 12.5% | 9.9% | 6.6% | <0.5% | 0% | 0.7% | 0% | 5.7% | 3.47% |
| (A) | | 51.4 | — | — | — | — | — | — | — | — |
| (B) | | — | 51.4 | — | — | — | — | — | — | — |
| (C) | | — | — | 51.4 | — | — | — | — | — | — |
| (D) | | — | — | — | 62.4 | — | — | — | — | — |
| (E) | | — | — | — | — | 57.4 | 56.8 | — | — | — |
| (F) | | — | — | — | — | — | — | 53.8 | — | 51.5 |

TABLE 4-continued

Adhesive formulation details

|  | Comp. 1 | Comp. 2 | Comp. 3 | Comp. 4 | Comp. 5 | Comp. 6 | Inv. 7 | Comp. 8 | Inv. 9 |
|---|---|---|---|---|---|---|---|---|---|
| polyol | PPO | PPO | PPO | PPO | PPO/PCL | PPO/PCL | PTHF | PTHF/PLC | PTHF |
| NCO Type | MDI | MDI | MDI | HDI | HDI | HDI | HDI | MDI | HDI |
| P1, wt % | 12.5% | 9.9% | 6.6% | <0.5% | 0% | 0.7% | 0% | 5.7% | 3.47% |
| (G) | — | — | — | — | — | — | — | 52.4 | — |
| PRINTEX 30 | 16.0 | 16.0 | 16.0 | 16.0 | 16.0 | 16.0 | 16.0 | 16.0 | 18.0 |
| POLESTAR R200 | 21.0 | 21.0 | 20.0 | 16.0 | 21.0 | 21.0 | 24.0 | 20.4 | 22.0 |
| HDK 20H | 0.5 | 0.5 | 0.5 | 16.0 | — | — | — | — | 2.0 |
| CARBITAL 140 | 5.0 | 5.0 | 4.1 | 5.0 | 5.0 | 5.0 | 5.0 | 5.0 | 2.0 |
| DESMODUR N3300 | 1.0 | 1.0 | 1.0 | — | — | — | — | — | — |
| VESTINOL 9 | 4.1 | 4.1 | 6.0 | — | — | — | — | 5.0 | 2.0 |
| Cat2010 | 0.9 | 0.9 | 0.9 | 0.5 | — | 1.0 | 1.0 | 1.0 | 2.0 |
| BiCat 8108M | — | — | — | — | 0.5 | — | — | — | — |
| DMDEE | 0.1 | 0.1 | 0.1 | 0.1 | 0.1 | 0.2 | 0.2 | 0.2 | 0.5 |
| Total | 100.0 | 100.0 | 100.0 | 100.0 | 100.0 | 100.0 | 100.0 | 100.00 | 100.0 |

[1]P = plasticizer

Adhesive Preparation:

Combine prepolymer, carbon black, pyrogenic silica, uncoated Kaoline, coated Kaoline, plasticizer and isocyanate to a planetary mixer and mix for 10 min under nitrogen at 30° C. Then set vacuum and let the mixture mix for additional 30 min at 30° C. If the mixture is homogeneous add catalyst (1) and catalyst (2) to the mixture and let it mix for 10 min at 30° C. under nitrogen. Then set vacuum and let the mixture mix for additional 20 min.

Test Results
Applied Methods
Tensile strength, e-modulus, elongation according to DIN 53504
Tear Resistance following DIN ISO 34-1
Lab shear strength following DIN EN 1465: substrate: e-coated steel, bonding area: 10*25 mm, adhesive layer thickness: 2 mm Prepolymer Results Table 5 presents the test data for the prepolymer itself. The prepolymers which use HDI over MDI show a significant reduction in viscosity as compared to the other formulations and therefore can be used without adding plasticizer, either to the prepolymer or the adhesive formulation.

TABLE 5

Test results for the prepolymers

|  | NCO [%] | NCO | NCO/OH | GPC [Mn] | GPC [Mw] | GPC PDI | GPC: sample recovery [Mn > 100] % | Viscosity 23° C.: Newtonian [Pas] | Diiso-nonyl-phthalate Conc. [%] |
|---|---|---|---|---|---|---|---|---|---|
| (A) | 1.821 | MDI | 2.2:1.0 | 17400 | 44400 | 2.6 | 75.8 | 132 | 15 |
| (B) | 1.922 | MDI | 2.1:1.0 | 8800 | 11400 | 1.3 | 81.1 | 19 | 10 |
| (C) | 2.651 | MDI | 2.0:1.0 | 12400 | 29900 | 2.4 | 74.9 | 77 | 15 |
| (D) | 2.23 | HDI | 2.2:1.0 | 7700 | 27300 | 3.5 | 91.1 | 103 | 0 |
| (E) | 4.014 | HDI | 2.1:1.0 | 4400 | 13600 | 3.1 | 95.3 | 26 | 0 |
| (F) | 2.955 | HDI | 1.7:1 | 5400 | 11500 | 2.1 | 95.3 | 71 | 0 |
| (G) | 3.025 | MDI | 1.7:1 | 5400 | 16700 | 3.1 | 93.7 | 1298 | 0 |

Adhesive Test Results

Table 6 shows the test data for the prepared adhesive formulations. The following can be concluded:

All inventive formulations meet an elastic modulus of above 20 MPa

The inventive formulations combine high elastic modulus with high bulk elongation of above 200%

The highest elastic moduli above 30 MPa are achieved by using aliphatic- (e.g. HDI) over aromatic (e.g. MDI) diisocyanates The use of PTMEG based polyether polyols over PPO further very significantly increases the bulk elongation and the tear strength Purely PPO based prepolymers do not meet the elastic modulus requirement Inventive formulations show high lap shear strength combined with cohesive failure mode

TABLE 6

Adhesive physical and mechanical data

| | Formulation | | | | | | | | |
|---|---|---|---|---|---|---|---|---|---|
| | Comp 1 | Comp 2 | Comp 3 | Comp 4 | Comp 5 | Comp 6 | Inv. 7 | Comp. 8 | Inv. 9 |
| polyol | PPO | PPO | PPO | PPO | PPO/PCL | PPO/PCL | PTHF | PTHF/PCL | PTHF |
| NCO Type | MDI | MDI | MDI | HDI | HDI | HDI | HDI | MDI | HDI |
| Tensile strength [MPa] | 7.5 | 5.3 | 7.3 | 7.7 | 10.8 | 10.8 | 19.1 | 13.8 | 16.1 |
| Elongation at break [5] | 210 | 666 | 301 | 173 | 273 | 251 | 424 | 303 | 467 |
| E-modulus [MPa] | 10.3 | 7.7 | 7.4 | 11.5 | 39.2 | 41.8 | 44.3 | 25.8 | 28.3 |
| Tear resistance [N/mm] | 9.3 | 31.2 | 9.5 | 8.3 | 20.8 | 24.3 | 38.9 | 21.3 | 46.6 |
| Lap Shear Strength after 24 h RT [MPa] | — | — | — | — | 2.6 | 0.4 | — | — | 0.4 |
| Lap Shear Strength after 7 d RT [MPa] | — | — | — | — | 8.1 | 7.5 | — | — | 9.5 |
| Lap Shear Strength after 14 d RT [MPa] | — | — | — | — | 7.8 | 8.1 | — | — | 13.6 |

Table 7 presents the limits for the bulk adhesive data and the prepolymer composition.

TABLE 7

| Requirements for bulk properties | |
|---|---|
| Tensile strength [MPa] | >15 |
| Elongation at break [%] | >350 |
| E-Modulus [MPa] | >28 |
| Tear resistance [N/mm] | >30 |

The invention claimed is:

1. A method for bonding coated or painted parts made of fiber-reinforced plastics; said method comprising the steps of applying a one-component adhesive consisting essentially of i) 45 to 90 wt %, based on the weight of the adhesive, of an isocyanate-terminated prepolymer consisting essentially of polymerized residues of (a) 40 to 95 wt %, based on the weight of the prepolymer, of a polytetramethylene ether glycol; and (b) 5 to 60 wt % based on the weight of the prepolymer, of an aliphatic diisocyanate, wherein the prepolymer contains 1.5 to 5 weight percent isocyanate groups, ii) a bismuth, tin or amine catalyst, iii) a filler that includes carbon black, kaolin and fumed silica and optionally (iv) a plasticizer to said parts and curing the adhesive.

2. The method of claim 1 in which the aliphatic diisocyanate is hexamethylene diisocyanate.

3. The method of claim 2 in which the polytetramethylene ether glycol has an Mn from 500 to 3000.

4. The method of claim 3 wherein the isocyanate-terminated prepolymer contains from 55 to 90 wt % of polymerized residues of the polytetramethylene ether glycol; and 10 to 45 wt % of polymerized residues of the aliphatic diisocyanate.

5. The method of claim 4 in which the fiber reinforced plastic is an epoxy composite.

6. The method of claim 4 in which adhesive contains from 7 to 40 wt % carbon black based on the weight of the adhesive.

7. The method of claim 6 wherein the adhesive further contains 9 to 40% kaolin based on the weight of the adhesive.

8. The method of claim 7 wherein the catalyst includes a bismuth catalyst.

9. The method of claim 4 wherein the catalyst includes a bismuth catalyst.

10. The method of claim 1 wherein the plasticizer is absent.

* * * * *